United States Patent [19]

Krämer

[11] 4,153,919
[45] May 8, 1979

[54] PROTECTIVE HOOD FOR CASSETTE TAPE RECORDERS

[75] Inventor: Jürgen Krämer, St. Georgen, Fed. Rep. of Germany

[73] Assignee: Dual Gebrüder Steidinger, St. Georgen, Fed. Rep. of Germany

[21] Appl. No.: 876,469

[22] Filed: Feb. 9, 1978

[51] Int. Cl.² .............................................. G11B 5/00
[52] U.S. Cl. .................................... 360/129; 360/137
[58] Field of Search ............... 360/128, 129, 137, 104, 360/96, 130

[56] References Cited

U.S. PATENT DOCUMENTS

| | | | |
|---|---|---|---|
| 2,867,439 | 1/1959 | Heurtier | 360/130 |
| 3,042,753 | 7/1962 | Iwamura | 360/130 |
| 3,678,214 | 7/1972 | Miura et al. | 360/130 X |
| 3,849,799 | 11/1974 | Nakamichi | 360/96 |
| 3,881,187 | 4/1975 | Nakamichi | 360/96 |
| 3,890,642 | 6/1975 | Platt | 360/96 |

Primary Examiner—John H. Wolff
Attorney, Agent, or Firm—Max Fogiel

[57] ABSTRACT

A protective arrangement for a cassette tape recorder in which a magnetic head has a face side facing upwards, and is located within the recorder. A protective hood covers the face side of the magnetic head, and is rotatably located about a horizontal axis which is perpendicular to the gap plane of the magnetic head. A coiled spring engages the protective hood, and urges it into a closed position. A switch for connecting the recorder to a power supply line, is connected to the protective hood, by a connection located so that upon moving the switch to an ON position, the protective hood is moved to an open position against the action of the spring. When the switch is moved to an OFF position, the movement of the protective hood to its closed position is released. A stop located on the protective hood, enters behind the cassette placed in the recorder in the opening position of the protective hood. Upon release of the closing movement of the protective hood by the switch, it makes contact with the cassette and thereby prevents the closing motion as long as the cassette is not removed from the recorder.

1 Claim, 2 Drawing Figures

PROTECTIVE HOOD FOR CASSETTE TAPE RECORDERS

BACKGROUND OF THE INVENTION

The present invention relates to a protective hood for a cassette tape recorder, which has the object of protecting the magnetic head against dust or undesirable mechanical strains which might lead to a maladjustment. With present recorders with a protective hood, the latter pivots about an axis and can be opened and closed by hand. The disadvantage of such an arrangement is that with each disconnection and connection of the device, a separate handle is necessary for operating the protective hood, and one may forget to close it, since it is a relatively small protective hood whose position (location) is not very conspicuous.

In another known arrangement, the magnetic head is protected by covering the entire opening in the recorder. This opening is used for accommodating the cassette, by means of a swivel chute which also holds the cassette. Flipping open the chute requires actuation of a separate interlock key; also, the use of a cassette chute in many cases is not desirable, with regard to the way the cassette is handled.

It is, therefore, an object of the present invention to simplify the handling of a tape recorder with protective hood and to prevent its actuation from being overlooked or forgotten.

Another object of the present invention is to provide a protective arrangement of the foregoing character which is substantially simple in construction and may be economically fabricated.

A further object of the present invention is to provide a protective arrangement for a cassette tape recorder, as described, which may be readily maintained in service and which has a substantially long operating life.

SUMMARY OF THE INVENTION

The objects of the present invention are achieved by providing a protective hood for covering the face side of a magnetic head which is located inside the recorder. The protective hood is located rotatably about a horizontal axis which is perpendicular to a gap plane of the magnetic head. A spring urges the protective hood into a closed position.

A switch which is used to connect the recorder to a power supply line, is also connected to the protective hood by a connection which is located so that upon moving the switch to an ON position, the protective hood is moved to an open position, against the action of the spring which engages the hood.

When the switch is moved to an OFF position, the movement of the protective hood to its closed position, is released.

In the opening position of the protective hood, a stop is located on the hood so that it enters behind the cassette placed in the recorder. Upon release of the closing movement of the protective hood by the switch, the stop contacts the cassette and thereby prevents the closing motion as long as the cassette remains in the recorder.

The use of the known idea of initiating several functions by actuating one operational element was not directly possible because the switching on and off of the recorder has no fixed relation to the presence or non-presence of a cassette, while the position of the protective hood depends on the presence of a cassette.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figures 1, 2:
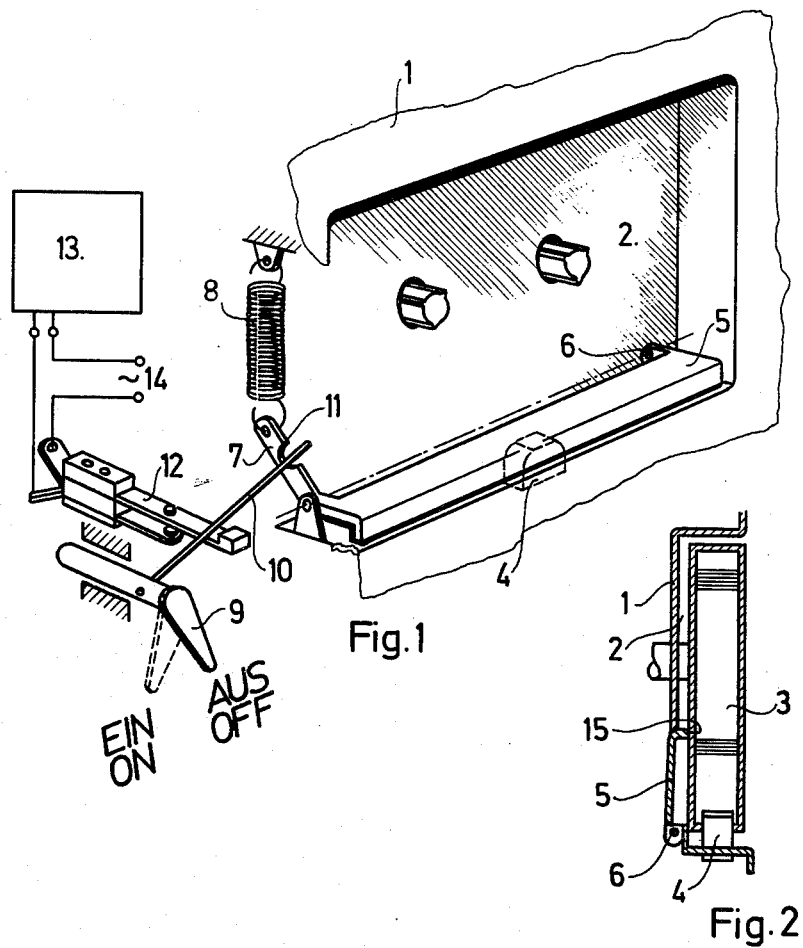
FIG. 1 shows a partial front view of a tape recorder.
FIG. 2 shows a section through a cassette placed into the recorder, with the magnetic head engaged.

The cassette tape recorder 1 has an opening 2 to hold a cassette 3. In the area of the lower portion of the opening 2, the magnetic head 4 is located with its level adjustable. The rear portion of the opening 2 holds a protective hood 5 which swivels about an axis 6. The protective hood 5 is connected to a lever 7 which is engaged by a spring 8. The spring pulls the protective hood 5 into its closed position shown in FIG. 1. A switch 9 for switching the recorder on and off is connected to an elastic arm 10 which engages a cutout 11 of lever 7. In the path of motion of arm 10 is a pair of contacts 12 via which the electrical portion 13 of the recorder can be connected to the line power supply 14.

If the switch 9 is placed in position "ON", the arm 10 of switch 9 closes the contact pair 12 and thus places the recorder electrically into operational readiness. At the same time, the arm 10 of switch 9 also swivels (pivots) lever 7 of the protective hood and brings it into the open position as shown in FIG. 2. In this position, cassette 3 can be placed into the recorder and by selecting the desired operational mode, the magnetic head 4 can be moved up to the cassette 3. If switch 9 is placed in position "OFF", the protective hood 5 remains in its position by pressing with a stop 15 against cassette 3 under the effect of the spring 8. Only when cassette 3 is taken out of the recorder, which does not always happen after the recorder is disconnected, is the protective hood 5 released in its closed position.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

I claim:

1. A protective device for a cassette tape recorder, comprising: means for receiving a tape cassette in said cassette tape recorder and holding said cassette in an operating position in said recorder; a magnetic head having a face side directed upwards and located underneath said means for receiving a cassette in said tape recorder and proximate the tape portion of said cassette when in the operating position; a protective hood for covering said face side of said magnetic head and rotatably located about a horizontal axis perpendicular to a gap plane of said magnetic head; a spring having means for engaging said protective hood to urge the hood pivotally into a closed position for covering said face side of said magnetic head when there is no tape cassette in said receiving means; switch means for connecting the recorder to a power supply line; connecting means between said switch means and said protective hood and located so that upon actuating said switch means to an ON position said protective hood is rotated so as to cooperate with the operating position of said tape recorder and against said spring means engaging said hood; said switch means being actuable to an OFF position for releasing movement of said hood to said closed position; stop means located along the free edge of said protective hood and positioned at a distance from said axis about which said protective hood is pivotable; said hood having an open position in which said stop means abutts the major remote cassette side when said cassette is in the operating position; said stop means being in contact with said cassette when in operating position and upon removal of said cassette the spring means returns said hood to its closed position.

* * * * *